(12) United States Patent
De Waal

(10) Patent No.: US 7,142,192 B2
(45) Date of Patent: Nov. 28, 2006

(54) CURSOR LOCATOR FOR MULTI-MONITOR SYSTEMS

(75) Inventor: Abraham B. De Waal, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 336 days.

(21) Appl. No.: 10/317,396

(22) Filed: Dec. 12, 2002

(65) Prior Publication Data

US 2004/0113888 A1    Jun. 17, 2004

(51) Int. Cl.
*G09G 5/08* (2006.01)
(52) U.S. Cl. .................. 345/157; 345/156; 345/1.1; 345/1.3; 345/163
(58) Field of Classification Search ........ 345/156–159, 345/163–166, 1.1–3.3; 715/716–717, 700, 715/856–862
See application file for complete search history.

(56) References Cited

U.S. PATENT DOCUMENTS

| | | | | |
|---|---|---|---|---|
| 5,047,754 A | * | 9/1991 | Akatsuka et al. | 345/163 |
| 5,473,343 A | * | 12/1995 | Kimmich et al. | 715/860 |
| 5,654,726 A | * | 8/1997 | Mima et al. | 345/2.2 |
| 5,898,419 A | * | 4/1999 | Liu | 345/660 |
| 5,963,195 A | * | 10/1999 | Gregg et al. | 345/159 |
| 5,969,697 A | * | 10/1999 | Tani et al. | 345/2.1 |
| 6,100,857 A | * | 8/2000 | Tani et al. | 715/726 |
| 6,246,397 B1 | * | 6/2001 | Vossler | 345/204 |
| 6,278,455 B1 | * | 8/2001 | Baker | 715/716 |
| 6,597,383 B1 | * | 7/2003 | Saito | 715/860 |
| 2002/0075230 A1 | * | 6/2002 | Okuda et al. | 345/157 |
| 2003/0201971 A1 | * | 10/2003 | Iesaka | 345/156 |

OTHER PUBLICATIONS

Microsoft Paint Version 4.0 1981-1998, illustration.*
nView Desktop Manager 2.0 User's Guide, Driver Version: Release 40, NVIDIA Corporation Oct. 2002, p. 128, http://download.nvidia.com/windows/40.72/nView_Users_Guide.pdf., (last accessed Apr. 11, 2003).

* cited by examiner

*Primary Examiner*—Amr A. Awad
*Assistant Examiner*—Sameer Gokhale
(74) *Attorney, Agent, or Firm*—Patterson & Sheridan, L.L.P.

(57) ABSTRACT

Embodiments of the present invention generally provide methods, systems, and articles of manufacture for locating a cursor displayed on one of a set of one or more monitors. According to some embodiments, in response to receiving specified user input, visual indication of the location of the cursor may be provided on one or more monitors not containing the cursor. Visual indication of the location of the cursor may also be provided on the monitoring containing the cursor. The specified user input may include any type of suitable user input, such as mouse movements, keystroke sequences (e.g., hot keys,) and/or audio input (e.g., voice commands). For some embodiments, parameters used for locating the cursor (e.g., the specified user input, sensitivity to mouse movements, etc.) may be specified by a user, for example, via a graphical user interface (GUI) screen.

33 Claims, 6 Drawing Sheets

CURSOR LOCATOR FOR MULTI-MONITOR SYSTEMS

BACKGROUND

1. Field of the Invention

Embodiments of the present invention generally relate to computer systems and, more particularly to locating a cursor in a computer system with multiple monitors.

2. Description of the Related Art

Computer systems have traditionally included a single monitor with a limited screen area. As users run more and more applications and process more information, they require larger screen areas. In other words, a user may be much more productive if more of the information can be displayed without having to change screen views (i.e., toggle) to find desired information. However, monitors with larger screen areas are expensive, and the price increase is typically disproportionate with the increase in screen area.

However, recent developments in computer graphics technology have resulted in a cost effective technique for increasing screen area through the use of multiple monitors. There are at least two approaches for driving multiple monitors in a computer system. In one approach, a graphics card (also referred to as a display adapter) is provided for each of the multiple monitors. In another approach, a single graphics card is capable of driving multiple monitors (e.g., 2–4 monitors per card). Further, multiple graphics cards, each capable of driving multiple monitors, may be combined to further increase the number of monitors. The number of graphics cards that may be combined is typically limited by the number of slots available for expansion, such as Peripheral Component Interconnect (PCI) slots or Accelerated Graphics Port (AGP) slots.

The multiple monitors allow the user to display different applications simultaneously on the multiple monitors, providing immediate access to the information they contain. As an example, a graphic designer may create graphical images using development tools, libraries, and palettes in one monitor while simultaneously viewing the results (the displayed image) a second monitor. As another example, a computer aided design (CAD) user may utilize multiple monitors to simultaneously view different applications, such as a design application on one monitor, while accessing a parts database on a second monitor.

However, while multiple monitors may increase the visible screen area, the larger screen area may become more difficult to manage. As an example, locating a relatively small cursor in a relatively large screen area may present a challenge. For example, a user working on an application in a system with multiple monitors may look down from the monitors for a moment (e.g., due to a phone call, to make a note, etc.). Upon looking up, the user may not remember which monitor contains the cursor. Locating the cursor, which may be time-consuming on a single monitor, may become very time-consuming when the user has to hunt through a screen area spanning several monitors.

One conventional method for locating a cursor located on a single monitor is to track the cursor with an animated image. For example, according to one cursor tracking method, a pair of eyes (i.e., "tracking eyes") change the direction they are looking to track cursor movements. For example, the method may involve determining a position of the cursor relative to the tracking eyes, and updating the direction the eyes are looking accordingly. A user may locate the cursor by searching the screen area following a path from the tracking eyes, in the direction the tracking eyes are looking, until the cursor is located.

While tracking eyes may be fairly effective for a relatively small screen area of a single monitor, for the larger screen area of a multiple monitor, the distance from the tracking eyes may be too great to be effective. For example, the user may have to follow a path from the tracking eyes across multiple monitors. Further, tracking images, such as the tracking eyes are typically displayed continuously and, therefore, take up precious screen real estate, which runs counter to the goal of expanding screen area.

Another conventional method to locate a cursor in a screen area, commonly utilized by (often frustrated) users, is to generate rapid movements with a mouse (e.g., back and forth, up and down, etc.). The rapid movement of the mouse may be intended to generate a visible cursor movement, which may be easier to detect with a human eye than a stationary cursor. However, in a multi-monitor system, the user may still have to scan multiple monitors to detect the visible cursor movements, which may result in an unacceptable delay. This delay may lead to decreased productivity and, therefore, runs counter to increased productivity goals of a multi-monitor system.

Accordingly, what is needed is an improved method for locating a cursor displayed in a multi-monitor system.

SUMMARY

Embodiments of the present invention generally provide methods, systems, and articles of manufacture for locating a cursor displayed on one of one or more monitors of a computer system.

One embodiment provides a method for locating a cursor displayed on one of a plurality of monitors of a computer system. The method generally includes receiving user input and, in response to receiving the user input, providing a visual indication of the cursor location on at least two of the plurality of monitors.

Another embodiment provides a method for locating a cursor displayed on a monitor. The method generally includes detecting mouse movements generated by a user and, in response to detecting the mouse movements, providing a visual indication of the cursor location on the monitor. For some embodiments, the monitor may be one of a plurality of monitors. For some embodiments, the shape and speed of the mouse movements may be specified by a user via a graphical user interface (GUI) screen. Exemplary shapes of the mouse movements may include horizontal mouse movements, vertical mouse movements, circular mouse movements, and other user-defined mouse movements.

Another embodiment provides a computer-readable medium containing a program for locating a cursor on one of a plurality of monitors. When executed by a processor, the program performs operations including detecting specified user input and, in response to detecting the specified user input, providing a visual indication of the cursor location on at least two of the plurality of monitors.

Another embodiment provides a computer system generally including a processor a storage medium containing a program. When executed by the processor, the program performs operations for detecting specified user input from one or more input devices and providing a visual indication, on at least two of a plurality of monitors, of a location of a cursor displayed on one of the plurality of monitors in response to detecting the specified user input.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods, systems and articles of manufacture for locating a cursor in a computer system having one or more monitors. While described with reference to computer systems having multiple monitors, it will be appreciated that aspects of the present invention may be used to an advantage in computer systems having a single monitor.

Figure 1:
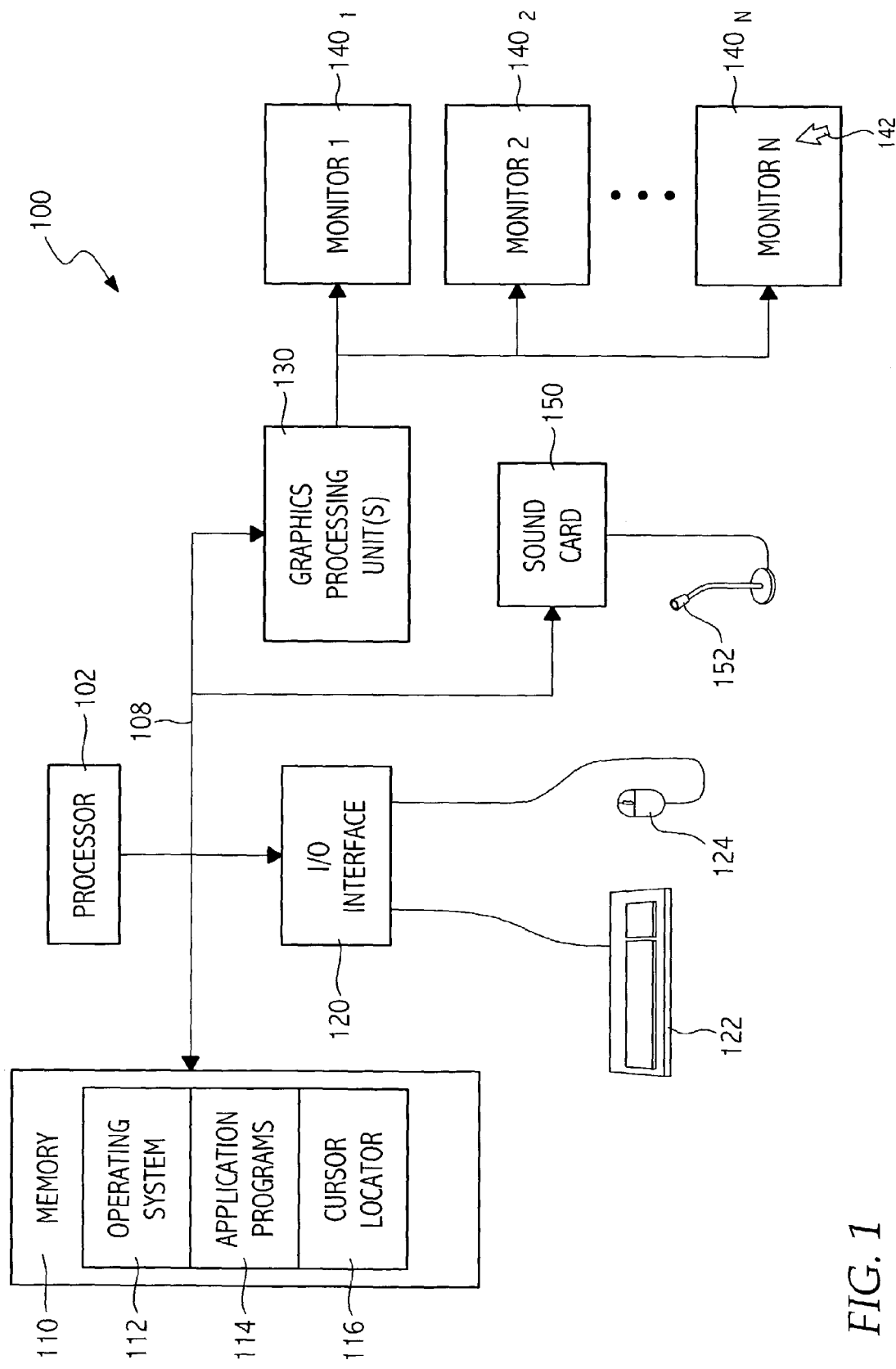
FIG. 1 illustrates an exemplary system according to an embodiment of the present invention.

Embodiments of the present invention may be implemented as a program product for use with a computer system such as, for example, the computer system 100 shown in FIG. 1. The program product may include a program which, when executed by a processor 102, performs functions of the embodiments (including the methods described herein). The program product can be contained on a variety of signal-bearing media, including, but not limited to, non-writable storage media (e.g., read-only memory devices, such as CD-ROM disks), alterable information stored on writable storage media (e.g., floppy disks, CD-R/W disks), or information conveyed to a computer by a communications medium, such as a computer network, telephone network, or wireless network. The latter embodiment specifically includes information downloaded from the Internet and other networks. Such signal-bearing media, when carrying computer-readable instructions that direct the functions of the present invention, represent embodiments of the present invention.

In general, the computer system 100 may represent any type of computer system with one or more monitors 140 (illustratively, shown as a set of N displays, $140_{1 \ldots N}$). The monitors 140 may include any combination of any type monitors, such as cathode ray tube (CRT) monitors and flat panel liquid crystal display (LCD) monitors. As an example, the computer system 100 may represent a desktop computer system and the monitors 140 may comprise a plurality of external monitors. As another example, the computer system 100 may be a portable computer (e.g., a laptop computer), and the monitors 140 may include an LCD attached to the laptop computer and an external monitor (e.g., a CRT, flat panel, or an external projection device). Further, the monitors 140 may be arranged in a specific order (such as an N×M array, a horizontal array, or a vertical array) or no particular order.

As illustrated, the computer system 100 may include an input/output (I/O) interface 120, one or more graphics processing units (GPUs) 130, and a sound card 150. The I/O interface 120 may allow the processor 102 to receive user input from various input devices, such as a keyboard 122 and a mouse 124, via a bus 108. Similarly, the sound card 150 may allow the processor 102 to receive user input from a microphone 152, via the bus 108. The GPUs 130 may receive graphical information from the processor 102 via the bus 108, and transform the graphical information into pixel data to be sent to the monitors 140. As previously described, the GPUs 130 may include a single GPU for each of the monitors 140 or may include one or more GPUs, each capable of driving multiple of the monitors 140. A cursor 142 may be displayed on one of the monitors 140 (illustratively, $140_N$).

Computer system 100 is shown comprising at least one processor 102, which obtains instructions and data via the bus 108 from a main memory 110. The processor 102 could be any processor adapted to support the methods of the invention. Main memory 110 could be one or a combination of memory devices, including Random Access Memory (RAM), nonvolatile or backup memory, (e.g., programmable or Flash memories, read-only memories, etc.). The memory 110 is shown configured with an operating system 112. The operating system 112 is the software used for managing the operation of the computer system 100. Examples of the operating system 112 include Microsoft Windows®, UNIX, Apple OS X, and the like.

The memory 110 further includes one or more application programs 114 and a cursor locator program 116. The application programs 114 and the cursor locator program 116 are software program products comprising a plurality of instructions that are resident at various times in various memory and storage devices in the computer system 100. When read and executed by one or more processors 102 in the computer system 100, the application programs 114 and the cursor locator program 116 cause the computer system 100 to perform the steps necessary to execute steps or elements embodying the various aspects of the invention. In general, the cursor locator program 116 may be configured to interact (e.g., through various system calls, subroutine calls, drivers, etc.) with other software and/or hardware components of the computer system 100 (e.g., the operating system 112, the I/O interface 120, the sound card 150, and/or the GPU 130) to perform operations for locating the cursor 142.

Locating the Cursor

Figure 2:
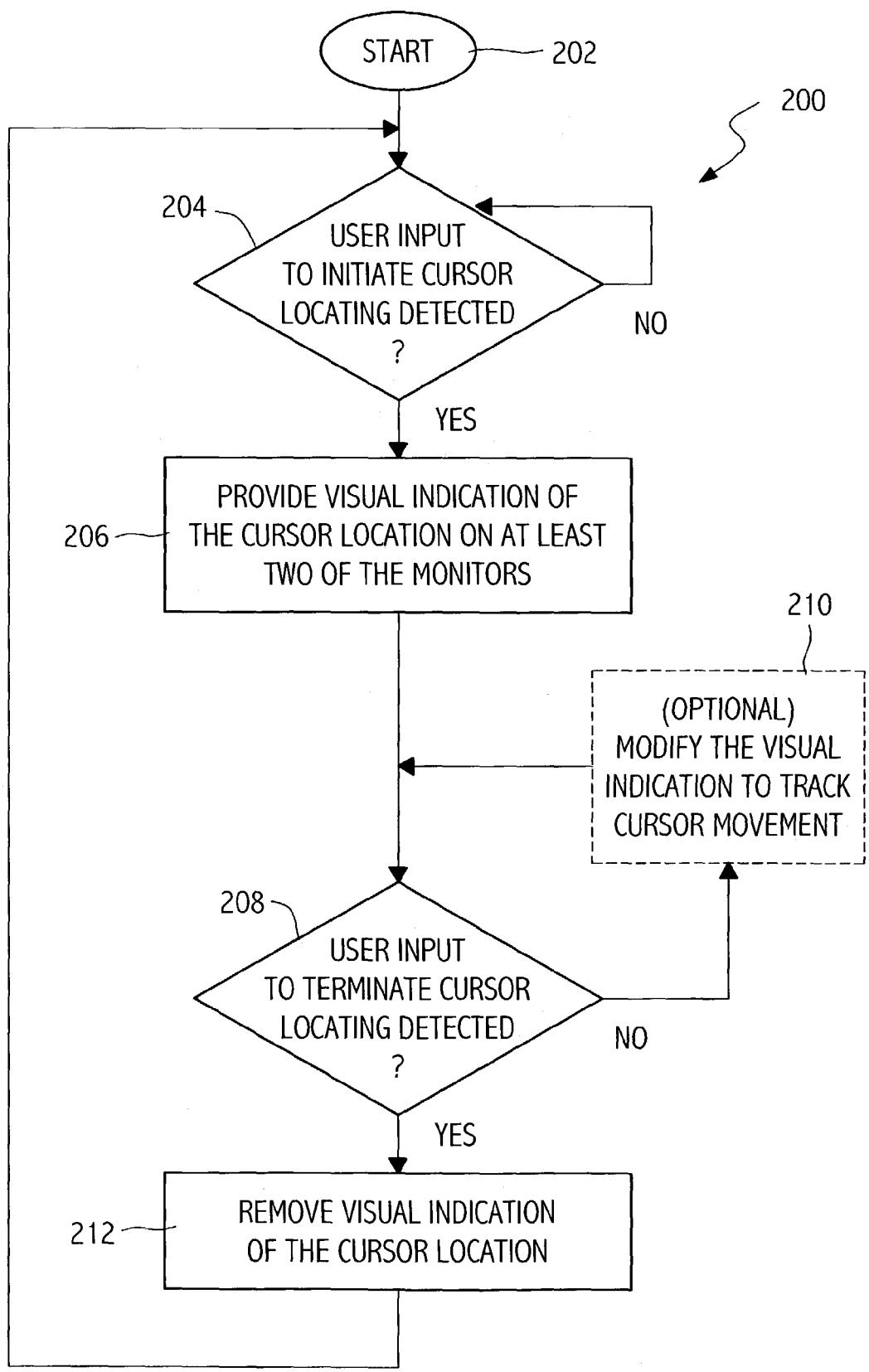
FIG. 2 illustrates exemplary operations for locating a cursor according to an embodiment of the present invention.

Operation of the cursor locator program 116 may be described with reference to FIG. 2, which illustrates operations 200 for locating the cursor 142 that may be performed by the cursor locator program 116. However, the operations 200 are exemplary only, and the cursor locator program 116 is not limited to performing the operations 200 and may perform other operations, as well. Further, as will be discussed in further detail below, some of the operations 200 may be performed by components (hardware and/or software) of the computer system 100 other than the cursor locator program 116.

The operations 200 begin at step 202, for example, by loading or enabling the cursor locator program 116 from an application program 114 or operating system 112. Cursor locating operations may be initiated upon detecting user input predefined for initiating cursor locating operations, at step 204, hereinafter referred to as "specified user input." At step 206, once the specified user input is detected, a visual indication of the cursor location is provided on at least two of the monitors.

The specified user input may be any suitable type input received from any type input device. For example, the specified input may be a sequence of keystrokes (commonly referred to as a hot key) received from the keyboard 122, specific movements and/or button presses from the mouse 124, audio input (e.g., a voice command) from the microphone 152, or any combination thereof. The user input may be detected using any conventional techniques. For example, the cursor locator program 116 may poll the operating system 112 to see if any input has been received by the I/O interface 120 or the sound card 150. As will be described in further detail below, the user input to initiate cursor locating may be specified by a user, for example, during a setup (e.g., initialization, configuration) routine using a standard graphical user interface (GUI) screen.

The visual indication of the cursor location may take any suitable form and may comprise static images or dynamic images (e.g., flashing or animation) designed to guide the user to the cursor 142. Visual indication may be provided on each of the monitors 140, or only a select two or more of the monitors 140. For some embodiments, visual indication may be provided on each of the monitors 140 not containing the cursor 142. The visual indication on a monitor 140 not containing the cursor 142 may simply indicate the monitor 140 does not contain cursor. The indication the monitor 140 does not contain cursor may be provided by altering the entire screen area of the monitor 140 (e.g. blanking, dimming, or blacking out the screen area), by providing a graphical image indicating the monitor 140 does not contain the cursor (e.g., an unhappy face), or by providing a graphical image indicating another monitor 140 contains the cursor.

Figures 3A, 3B:
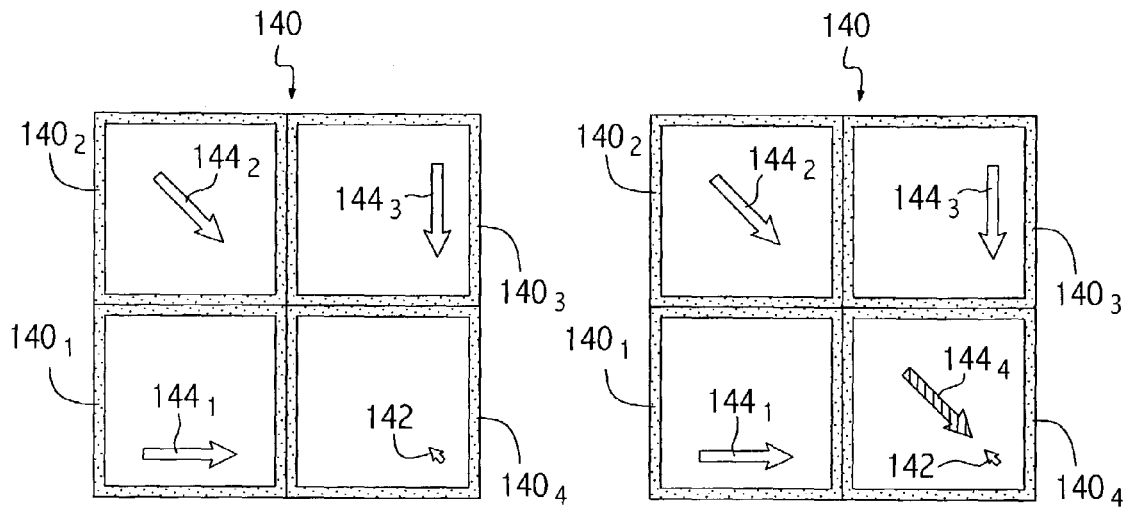
FIGS. 3A–3D illustrate examples of visual indications of cursor location that may be provided on multiple monitors.

For example, as illustrated in FIGS. 3A, which illustrates a 2×2 array of monitors $140_{1...4}$, graphical images $144_{1...3}$ on the monitors $140_{1...3}$ may be provided to indicate the cursor 142 is located on the monitor $140_4$. As illustrated, the graphical images $144_{1...3}$ may be arrows pointing in the direction of the monitor $140_4$ containing the cursor 142. Of course, it will be appreciated that other types of graphical images (e.g., pointing fingers) may also accomplish the desired affect of indicating the location of the cursor 142.

As illustrated in FIG. 3B, a graphical image $144_4$ may also be provided on the monitor $140_4$ containing the cursor 142. The graphical image $144_4$ may be of the same type (e.g., shape and color) as the graphical images $144_{1...3}$, or may be designed to be readily differentiated from the graphical images $144_{1...3}$, which may facilitate locating the cursor by the user. For some embodiments, the graphical image $144_4$ may be a different color (as indicated by cross hatching) than the graphical images $144_{1...3}$. For example, the graphical images $144_{1...3}$ may be green to indicate the user should keep searching and the graphical image $144_4$ may be red to indicate the user should stop searching. As another example, in FIG. 3D, which illustrates a horizontal array of the monitors $140_{1...4}$, each of the graphical images $144_{1...4}$ may be a different color. (e.g., ranging from blue to red, corresponding to a temperature gradient) to indicate the user is getting "hotter or colder" in a search for the cursor 142.

Figure 4A:
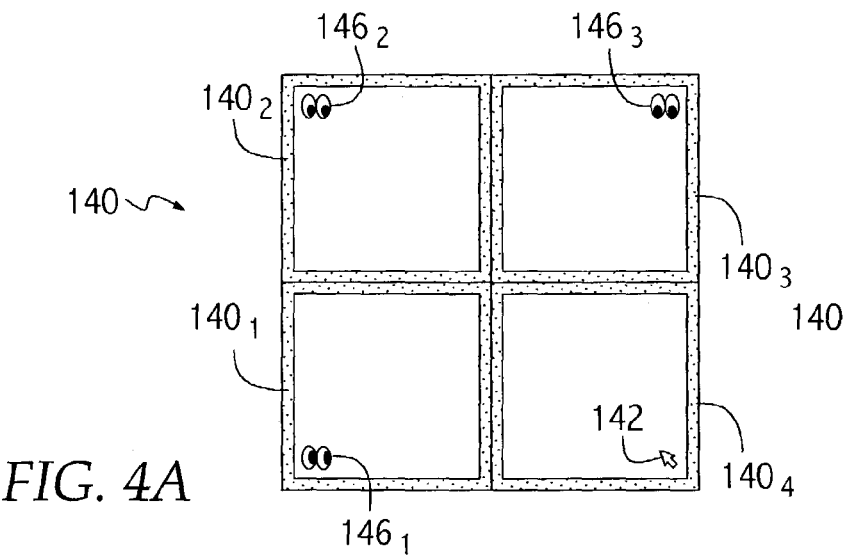
FIGS. 4A–4C illustrate examples of animated visual indications of cursor location that may be provided on multiple monitors.
Figure 4B:
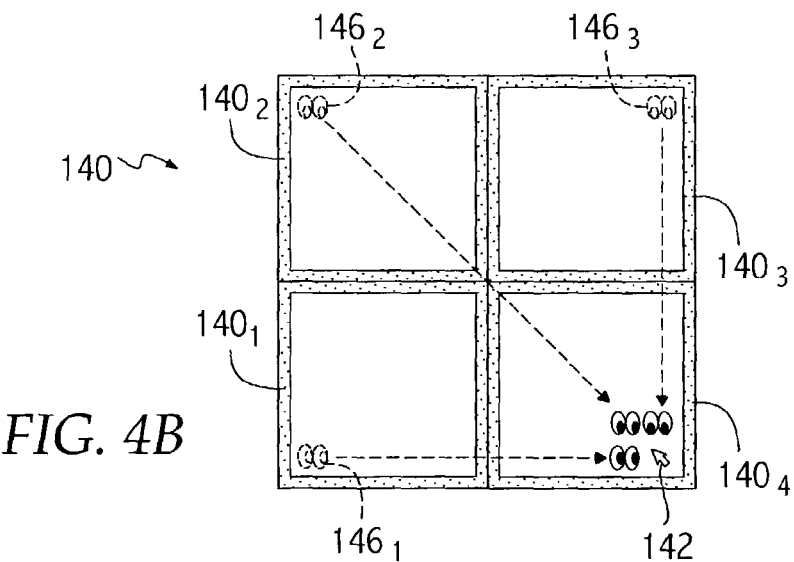
Figure 4C:
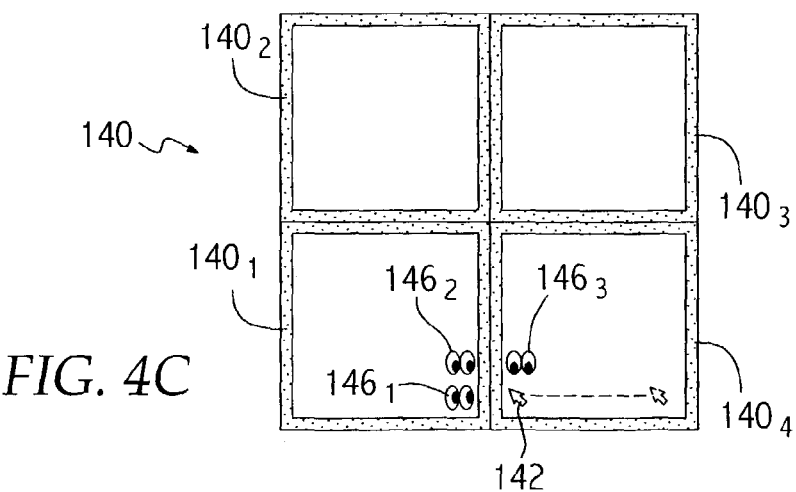

As illustrated in FIGS. 4A–4C, visual indication of the cursor location may also be provided in the form of animated images $146_{1...3}$. For example, as illustrated in FIG. 4A, the animated images $146_{1...3}$ may each be a pair of tracking eyes provided on each of the monitors $140_{1...3}$. Each pair of tracking eyes may look in the direction of the location (on monitor $140_4$) of the cursor 142. As illustrated in FIG. 4B, in an animated sequence (i.e., over a sequence of screen images) the animated images $146_{1...3}$ (simultaneously or separately) may converge on the cursor 142. Accordingly, regardless of which monitor a user is searching, the animated sequence may be highly effective in guiding the user to the cursor 142. Of course any other suitable image (i.e., other than tracking eyes) may also be used in an animated sequence (e.g., an animated cat from one or more of the monitors $140_{1...3}$ may converge on the "mouse" cursor 142).

Figure 3C:
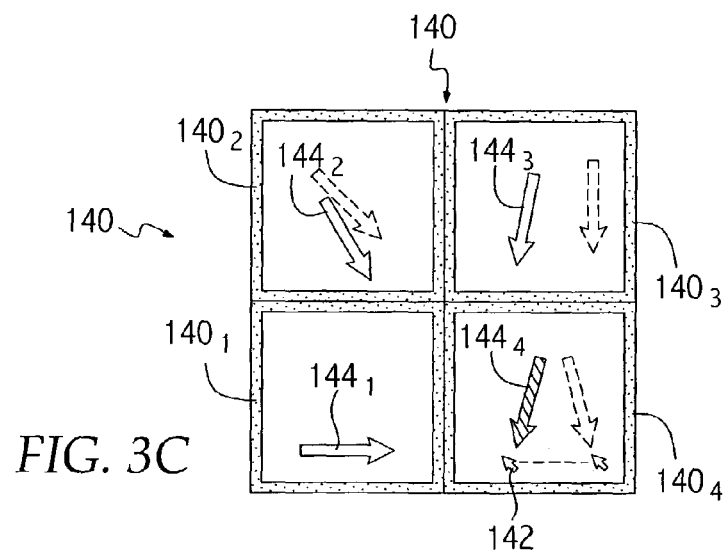
Figure 3D:
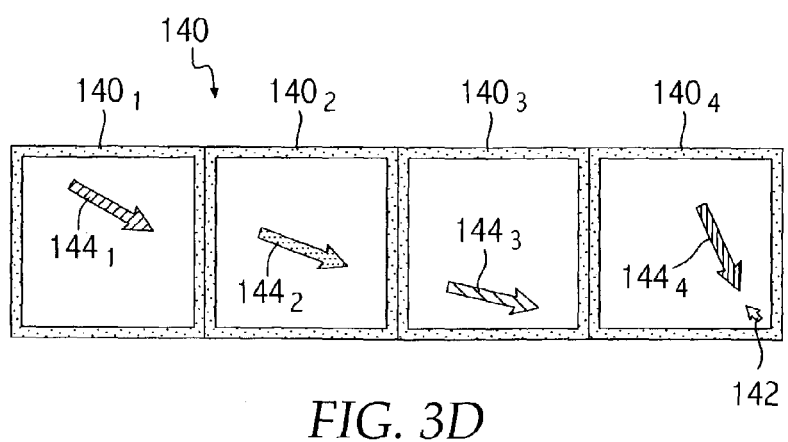

Prior to detecting user input predefined to terminate cursor locating operations, at step 208, the visual indication may be optionally modified to track cursor movement, at step 210. For example, FIG. 3C shows the cursor 142 having moved relative to the position of the cursor 142 shown in FIG. 3B. As illustrated, the graphical images $144_{1...4}$ may be modified (and redrawn) to indicate the new location of the cursor 142. As another example, the tracking eyes $146_{1...3}$ may track the cursor 142 as it moves from the location shown in FIG. 4B to the location shown in FIG. 4C. Tracking the cursor movements with the visual indication of the cursor location may further facilitate locating the cursor and/or prevent the user from losing the cursor 142.

Whether static or animated, features of the visual indication (e.g., size, shape, location, directional features, etc. of the graphical images 144 or animated images 146) may be determined based on calculations using the current cursor position which may be obtained by well known system calls. For some embodiments, the graphical images 144 may be provided in a standard manner, by modifying a screen image in software and sending the modified image to the GPU for processing. However, due to possible complications in the operating system 112, modifying the screen image may not be a trivial task and the possibility exists that the visual indication and/or cursor will be occluded (i.e., blocked from view) by another display element, such as a window. Therefore, for other embodiments, visual indication (e.g., the graphical images 144 or animated images 146) and/or cursor 142 may be generated directly in hardware (e.g., in the GPU 130), bypassing software. For example, the processor 102 may configure (e.g., program) the GPU to generate the visual indication directly, independent of a screen image processed by the GPU. Bypassing software may eliminate the possibility of the visual indication and/or the cursor 142 being occluded and the visual indication and the cursor 142 may be displayed regardless of the screen image sent to the GPU by an application program.

At step 212, once specified user input for terminating cursor locating operations is detected, visual indication of the cursor location is removed. As with the specified user input for initiating the cursor locating operations, the user input predefined for terminating cursor locating operations may be any suitable type user input.

For example, a first hot key sequence may initiate the cursor locating operations while a second hot key sequence may terminate the cursor locating operations. For some embodiments, the user input predefined for terminating cursor locating operations may simply be a termination specified user input for initiating the cursor locating operations. As a simple example, if the cursor locating operations are initiated by holding down a mouse button, the cursor locating operations may be terminated by releasing the mouse button. As another example, the same predefined user input may be used to initiate and terminate the cursor locating operations (e.g., to toggle between displaying the visual indication and removing the visual indication). For some embodiments, however, visual indication of the cursor location may be removed after a predetermined time period, for example, without receiving any specified user input.

Detecting Mouse Movements

As previously described, one common reaction to a user when attempting to locate a cursor is to generate rapid (e.g., back and forth) movements with the mouse 122, in an effort to generate a visible cursor movement. For some embodiments, the cursor locator program 116 may be configured to detect rapid mouse movements as an indication a user is searching for the cursor 142.

Figure 5A:
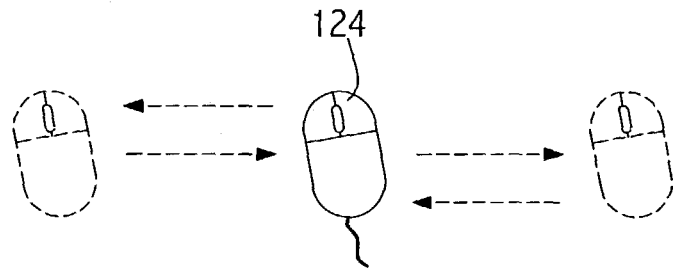
FIGS. 5A–5C illustrates exemplary mouse movements that may be used to initiate cursor locating.
Figure 5B:
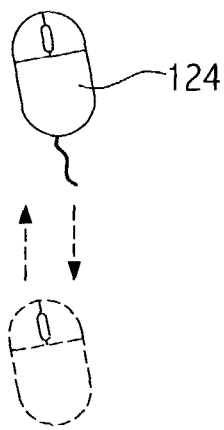
Figure 5C:
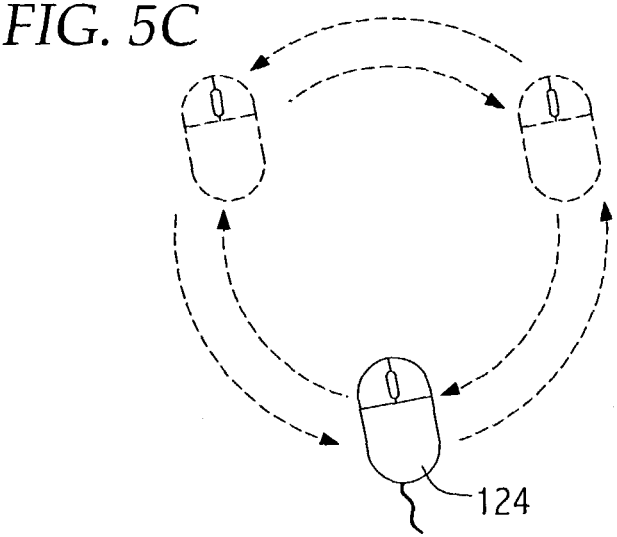

In other words, these rapid mouse movements may be defined as specified user input for initiating the cursor locating operations. The cursor locator program 116 may be configured to detect any random rapid mouse movements to initiate cursor locating operations, or specific user-specified mouse movements. For example, specific mouse movements may include rapid horizontal movements, as illustrated in FIG. 5A, rapid vertical movements, as illustrated in FIG. 5B, circular movements, as illustrated in FIG. 5C, or any other specific mouse movements (not shown), such as diagonal movements or lifting the mouse from a mouse pad, which may be characterized by a single rapid movement of the cursor. For some embodiments, visual indication of the cursor location may be provided in response to detecting a circular mouse movement in a first (i.e., clockwise or counter-clockwise) direction and the visual indication may be removed in response to detecting a circular mouse movement in a second, opposite direction.

Of course, the user may not make perfectly horizontal, vertical, or circular mouse movements. Accordingly, the cursor locator program 116 may be configured to detect a general shape of rapid mouse movements and determine if the general shape matches a user specified shape for initiating cursor locating operations. The cursor locator program 116 may use any suitable algorithm with any suitable operations for detecting rapid mouse movements, such as sampling cursor positions, determining a rate of change of the sampled positions, and determining the general shape of the rapid movements (i.e., generally horizontal, vertical, circular, diagonal, or indicative of lifting the mouse) based on the sampled positions.

User-Specified Cursor Locating Parameters

Figure 6A:
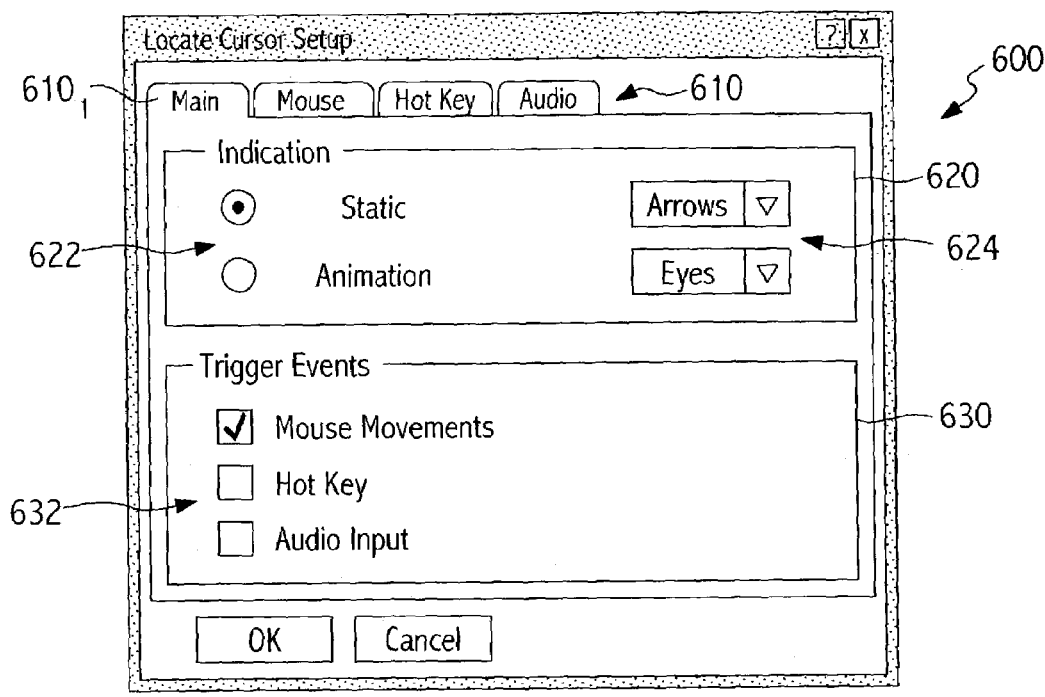
FIGS. 6A–6B illustrate exemplary graphical user interface (GUI) screens for specifying cursor locating parameters.
Figure 6B:
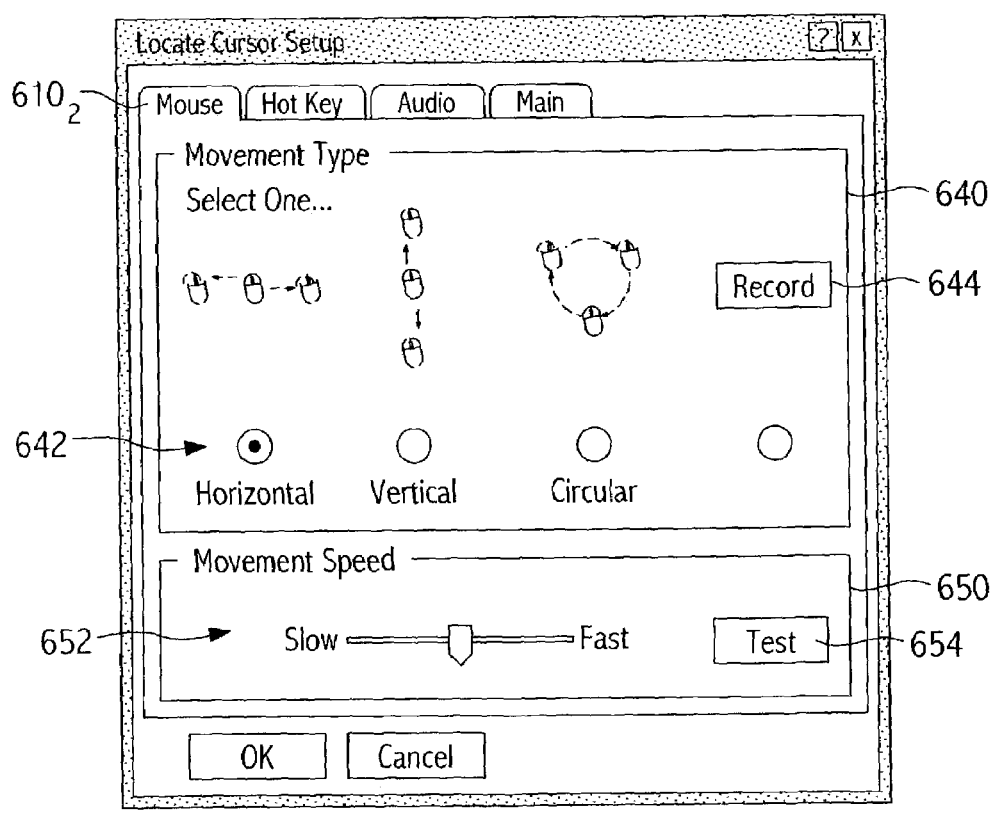

For some embodiments, the user may be able to configure the cursor locator program 116 to detect specific mouse movements and/or specify other configuration parameters. As previously described, a user may configure the cursor locator program 116 by specifying various parameters via any suitable interface, such as a command line or graphical user interface (GUI). For example, FIGS. 6A and 6B illustrate an exemplary GUI screen 600 that may be presented to a user for specifying the cursor locating parameters. Of course, the GUI screen 600 is illustrative of only one embodiment and various embodiments may provide different options for user configuration.

As illustrated in FIG. 6A, the GUI screen 600 may include several tabs 610 for specifying different parameters to configure the cursor locator program 116. As illustrated, a main tab $610_1$, is selected. As illustrated, the main tab $610_1$ includes a window 620 for specifying the visual indication of the cursor location. For example, the window 620 may include radio buttons 622 for selecting static or animated indication. The window 620 may also include pull down menus 624 for selecting a particular static visual indication (e.g., arrows, pointing fingers, etc.) or for selecting a particular animation (e.g., tracking eyes, cats, etc.).

The main tab $610_1$ may also include a window 630 for specifying the type of user input (or "trigger events") for initiating cursor locating operations. For example, the window 630 may include checkboxes 632 for selecting any combination of mouse movements, hot keys, and/or audio input as user input for initiating cursor locating operations. The user may then specify further parameters, depending on the trigger event(s) selected, via other tabs 610. For example, a hot key tab may allow the user to select (or "record") a sequence of one or more keystrokes to define as a hot key for initiating cursor locating operations. Similarly, an audio tab may allow the user to record an audio input, such as a voice command, for initiating cursor locating operations.

As illustrated in FIG. 6B, a mouse tab $610_2$ may allow a user to specify a shape and sensitivity of mouse movements for initiating cursor locating operations. For example, the mouse tab $610_2$ may include a window 640 allowing a user to select from a predefined group of mouse movements (e.g., horizontal, vertical, or circular) via radio buttons 642. The user may also specify and record another type of mouse movement via a record button 644, which may bring about a separate GUI screen allowing the user to record a custom (e.g., not already shown in the window 640) mouse movement. The mouse tab $610_2$ may also include a window 650 allowing the user to specify a sensitivity to the specified mouse movements. For example, the user may be able to control how rapid the mouse movements must be to initiate the cursor locating operations, via a slide control 652. The user may be able to verify the mouse movement settings (e.g., how rapid the mouse movements must be) via a test button 654. For example, pressing the test button 654 may bring about another GUI screen that provides visual indication when the proper speed and shape of mouse movements is detected.

Accordingly, embodiments of the present invention provide methods, systems, and articles of manufacture for locating a cursor in a computer system with multiple monitors. By providing a visual indication of the cursor location on at least two of the monitors, a user may be guided to the cursor. Thus, the user may spend less time searching for the cursor and more time working with an application, thus increasing productivity.

While the foregoing is directed to embodiments of the present invention, other and further embodiments of the invention may be devised without departing from the basic scope thereof, and the scope thereof is determined by the claims that follow. In the claims, the order in which steps and/or operations are listed do not imply any particular order for performing the steps, unless specifically stated in the claim.

What is claimed is:

1. A method for visually indicating a location of a cursor displayed on one of a plurality of monitors to a user of a computer system, the method comprising:
   receiving specified user input from said user; and
   in response to receiving the specified user input, providing a visual indication to said user, apart from the cursor itself, of the actual cursor location concurrently on at least two of the monitors, wherein the visual indication provided to said user includes a first visual indication of the cursor location on one of the at least two of the monitors that does not display the cursor, and a second visual indication of the cursor location on another one of the at least two of the monitors.

2. The method of claim 1, wherein the second visual indication is provided on the monitor displaying the cursor.

3. The method of claim 1, further comprising removing the visual indication of the cursor location on each of the monitors in response to receiving additional user input.

4. The method of claim 1, further comprising removing the visual indication of the cursor location on each of the monitors in response to detecting that the received specified user input has been removed.

5. The method of claim 1, further comprising removing the visual indication of the cursor location after a predetermined time period.

6. The method of claim 1, wherein the received specified user input comprises a first sequence of one or more keystrokes and the method further comprises removing the visual indication of the cursor location on each of the monitors in response to detecting a second sequence of one or more keystrokes.

7. The method of claim 1, wherein providing a visual indication of the actual cursor location concurrently on at least two of the monitors comprises providing an animated sequence.

8. The method of claim 7, wherein providing the animated sequence comprises displaying a graphical image successively on the at least two monitors and moving the graphical image in a direction toward the cursor location.

9. The method of claim 1, further comprising modifying the visual indication to track movement of the cursor.

10. The method of claim 1, further comprising providing a graphical user interface (GUI) screen allowing a user to specify a threshold speed of mouse movements, wherein the specified user input comprises movements of the mouse at a speed greater than the threshold speed.

11. The method of claim 1, further comprising modifying the visual indication in response to cursor movement, including moving the visual indication on at least one of the monitors to a new location.

12. A method for visually indicating an actual location of a cursor displayed on a monitor to a user, the method comprising:
    detecting mouse movements generated by said user; and
    in response to the detecting of the mouse movements, providing a visual indication to said user, apart from the cursor itself, of the actual cursor location on the monitor, wherein the monitor is one of a plurality of monitors, and wherein providing a visual indication of the cursor location on the one monitor comprises providing a visual indication, not including the cursor itself, of the cursor location on at least one monitor not displaying the cursor.

13. The method of claim 12, comprising providing the visual indication for a predetermined amount of time after detecting the mouse movements have stopped and subsequently removing the visual indication.

14. The method of claim 12, comprising providing a graphical user interface (GUI) screen allowing a user to vary a detectable speed of the mouse movements, the variable speed establishing a threshold for minimum mouse movement speed to initiate the visual indication of the cursor location.

15. The method of claim 12, comprising providing a graphical user interface (GUI) screen allowing a user to select a detectable mouse movement from a plurality of types of mouse movements to initiate the visible indication of the cursor location.

16. The method of claim 15, wherein the GUI further allows the user to specify a type of mouse movement other than the plural of types of mouse movements to initiate the visible indication of the cursor location.

17. The method of claim 12, further comprising modifying the visual indication in response to cursor movement, including moving the visual indication on at least one of the monitors to a new location.

18. A computer-readable medium containing a program for visually indicating a location of a cursor on one of a plurality of monitors which, when executed by a processor, performs operations comprising:
    detecting specified user input; and
    in response to detecting the specified user input, providing a visual indication, apart from the cursor itself, that points to the cursor location on at least two of the plurality of monitors,
    wherein the visual indication includes a first visual indication of the cursor location on one of the at least two of the monitors that does not display the cursor, and a second visual indication of the cursor location on another one of the at least two of the monitors.

19. The computer-readable medium of claim 18, wherein the operations further comprise providing a graphical user interface (GUI) allowing a user to specify at least one type of user input as the specified user input.

20. The computer-readable medium of claim 19, wherein the at least one type of user input comprises at least one of a mouse movement or keyboard input.

21. The computer readable medium of claim 20, wherein the GUI further allows the user to specify a type of the visual indication.

22. The computer readable medium of claim 20, wherein the GUI allows the user to specify an animated type of visual indication.

23. The system of claim 19, wherein the GUI allows a user to specify a threshold speed of mouse movements, wherein the specified user input comprises movements of the mouse at a speed greater than the threshold speed.

24. A system comprising:
    a processor; and
    a storage medium containing a program which, when executed by the processor, performs operations for visually indicating a location of a cursor on one of a plurality of monitors, the operations comprising detecting specified user input from a mouse and providing a visual indication, apart from the cursor itself, on at least two of the monitors, that points to a location of the cursor in response to detecting the specified user input, wherein the visual indication occurs when the user input comprises rapid movement of the mouse by the user.

25. The system of claim 24, wherein:
    the system further comprises a graphical processing unit (GPU) coupled with the processor; and
    providing the visual indication of the location of the cursor comprises configuring the GPU to directly generate the visual indication of the location of the cursor.

26. The system of claim 24, wherein the operations further comprise removing the visual indication of the cursor location after a predetermined period of time.

27. The system of claim 24, wherein the operations further comprise removing the visual indication of the cursor location in response to detecting additional user input.

28. The system of claim 24, wherein the operations further comprise modifying the visual indication to track cursor movement, including moving the visual indication on the monitors where the visual indication appears to track a change in the location of the cursor.

29. The system of claim 24, wherein providing a visual indication of the location of the cursor comprises providing a visual indication of the cursor on each of the plurality of monitors including the monitor on which the cursor is located.

30. The system of claim 29, wherein providing a visual indication of the cursor location on each of the plurality of monitors comprises:

providing a first visual indication of the cursor location on one or more monitors not displaying the cursor; and providing a second visual indication on the monitor displaying the cursor.

31. The system of claim 24, wherein the specified user input comprises a first sequence of one or more keystrokes and the operations further comprise removing the visual indication of the cursor location in response to detecting a second sequence of one or more keystrokes.

32. The system of claim 24, wherein providing a visual indication of the cursor location on at least two of the plurality of monitors comprises providing an animated sequence.

33. The system of claim 32, wherein providing the animated sequence comprises displaying graphical images on the at least two monitors and moving the graphical images in a direction of the cursor location.

* * * * *

UNITED STATES PATENT AND TRADEMARK OFFICE
CERTIFICATE OF CORRECTION

PATENT NO. : 7,142,192 B2 Page 1 of 1
APPLICATION NO. : 10/317396
DATED : November 28, 2006
INVENTOR(S) : Abraham B. De Waal It is certified that error appears in the above-identified patent and that said Letters Patent is hereby corrected as shown below:

In column 10, line 8, please replace "plural", with --plurality--

Signed and Sealed this

Twenty Second Day of April, 2008

JON W. DUDAS
*Director of the United States Patent and Trademark Office*